United States Patent
Marsh et al.

(10) Patent No.: US 8,052,075 B2
(45) Date of Patent: Nov. 8, 2011

(54) METHOD FOR PURIFICATION OF SEMICONDUCTING SINGLE WALL NANOTUBES

(75) Inventors: Eugene P. Marsh, Boise, ID (US); Gurtej S. Sandhu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 711 days.

(21) Appl. No.: 12/062,405

(22) Filed: Apr. 3, 2008

(65) Prior Publication Data

US 2009/0252946 A1 Oct. 8, 2009

(51) Int. Cl.
B02C 19/18 (2006.01)

(52) U.S. Cl. .................... 241/1; 241/14; 241/21

(58) Field of Classification Search ............... 241/1, 14, 241/21
See application file for complete search history.

(56) References Cited

U.S. PATENT DOCUMENTS

| 6,555,945 | B1 | 4/2003 | Baughman et al. |
| 6,821,730 | B2 | 11/2004 | Hannah |
| 7,014,737 | B2 | 3/2006 | Harutyunyan et al. |
| 7,150,865 | B2 | 12/2006 | Harutyunyan et al. |
| 7,387,735 | B2 * | 6/2008 | Park et al. ............... 210/651 |
| 2007/0264185 | A1 | 11/2007 | Campbell et al. |

FOREIGN PATENT DOCUMENTS

JP 8231210 9/1996

OTHER PUBLICATIONS

"Anatomy of a Patenting Area: Purification of Carbon Nanotubes based on the Nano SPRINT Encyclopedia of Carbon Nanotubes", *Carbon Nanotubes Monthy* (No. 6), www.nanosprint.com/.../archive/no6_feb_2006/anatomy_of_a_patenting_area_purification_of_carbon_nanotubes/-46k-, (Feb. 2006), 3 pages.

"Producing Lower Cost Single-Walled Carbon Nanotubes without Metal Catalysts", *National Aeronautics and Space Administration*, ipp.gsfc.nasa.gov/ft-tech-nanotech.html, (Nov. 6, 2006),2 pages.

Chiang, I W., et al., "Purification and Characterization of Single-Walled Carbon Nanotubes", *J.Phys. Chem. B.*, vol. 105, No. 6, (Jan. 12, 2001),1157-1161.

Martinez, M. T., et al., "Microwave single walled carbon nanotubes purification", *The Royal Society of Chemistry 2002*, (Apr. 8, 2002),1000-1001.

* cited by examiner

*Primary Examiner* — Faye Francis
(74) *Attorney, Agent, or Firm* — Schwegman, Lindberg & Woessner, P.A.

(57) ABSTRACT

A process of forming a semiconductive carbon nanotube structure includes imposing energy on a mixture that contains metallic carbon nanotubes and semiconductive carbon nanotubes under conditions to cause the metallic carbon nanotubes to be digested or to decompose so that they may be separated away from the semiconductive carbon nanotubes.

10 Claims, 4 Drawing Sheets

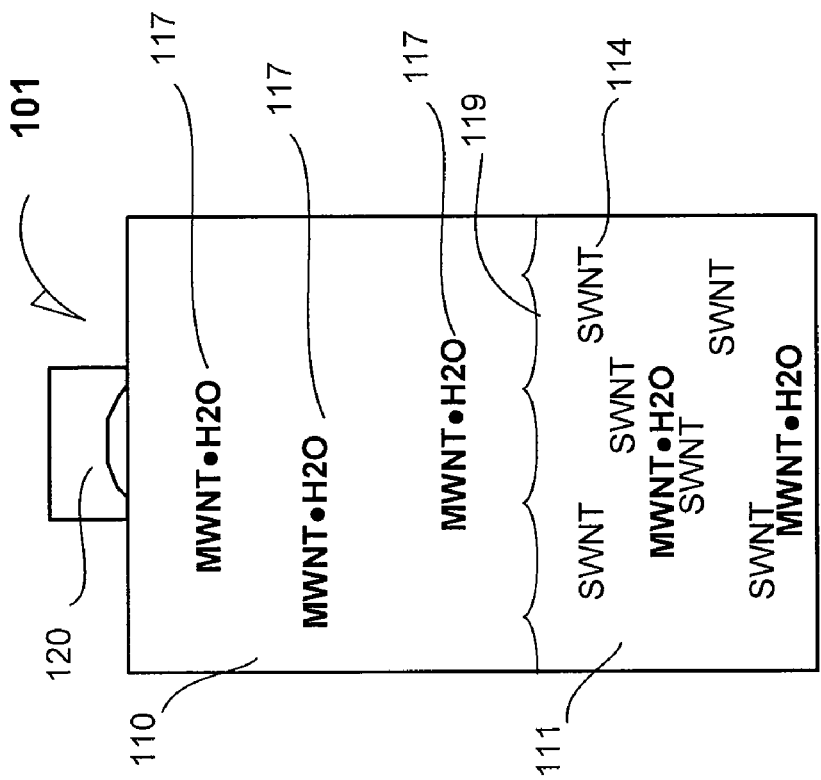
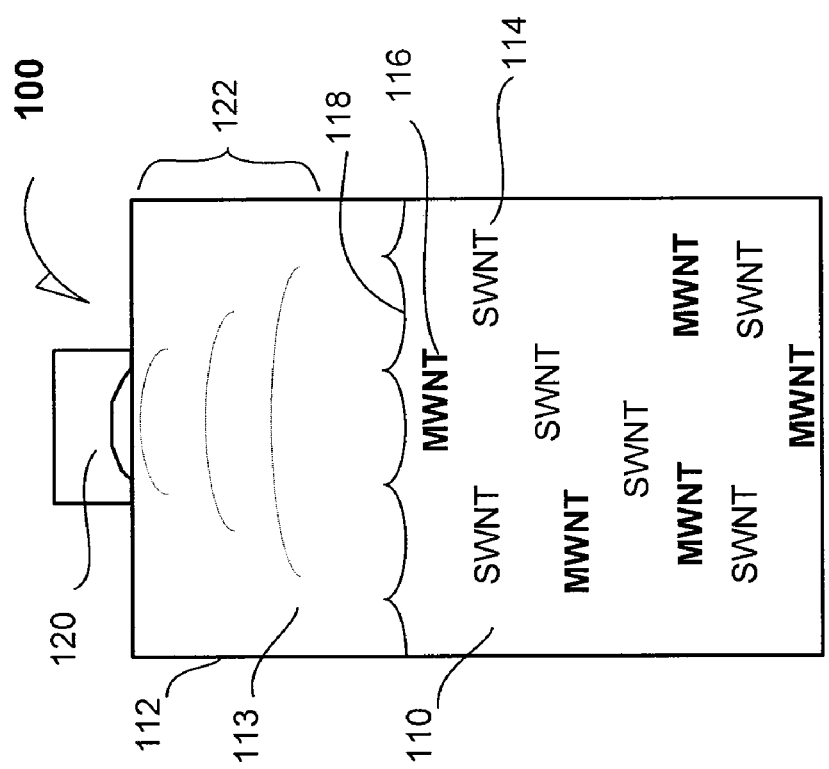
Fig. 1a
Fig. 1b

METHOD FOR PURIFICATION OF SEMICONDUCTING SINGLE WALL NANOTUBES

BACKGROUND

Carbon nanotubes are cylindrical carbon molecules with properties that make them useful in a wide variety of applications. Carbon nanotubes exhibit exceptional mechanical strength and electrical properties and are useful heat conductors.

Carbon nanotubes can occur in single-walled and multi-walled forms. The structure of a single-walled nanotube (SWNT) can be conceptualized by wrapping a 1 atom-thick layer of graphite/graphene into a cylinder. The properties of the carbon nanotubes may be affected by the path taken to wrap the graphite/graphene during formation. Carbon nanotubes may exhibit electrical properties such as conductive or semiconductive properties. Multi-wall carbon nanotubes (MWNT) can be conceptualized as multiple layers of graphite/graphene rolled in on themselves to form a tube shape. SWNTs may exhibit either conductive or semiconductive electrical properties. MWNTs may exhibit conductive electrical properties.

The combination of electronic and mechanical properties of carbon nanotubes has lead to wide ranging proposals for their potential use in future electronics and materials applications, field emitter devices, sensors, electrodes, high strength composites, and storage structures of hydrogen, lithium and other metals for example.

Where the carbon nanotube structures exhibit semiconductive electrical properties, it is of interest to isolate bulk amounts thereof for semiconductor uses.

While disclosed embodiments may be motivated in addressing the above identified issues, they are in no way so limited.

BRIEF DESCRIPTION OF THE DRAWINGS

FIG. 1a shows a schematic depiction of a single-wall carbon nanotube purification process according to an example embodiment;

FIG. 1b shows a schematic depiction of the single-wall carbon nanotube purification process depicted in FIG. 1a after further processing according to an example embodiment;

DETAILED DESCRIPTION

Figure 2:
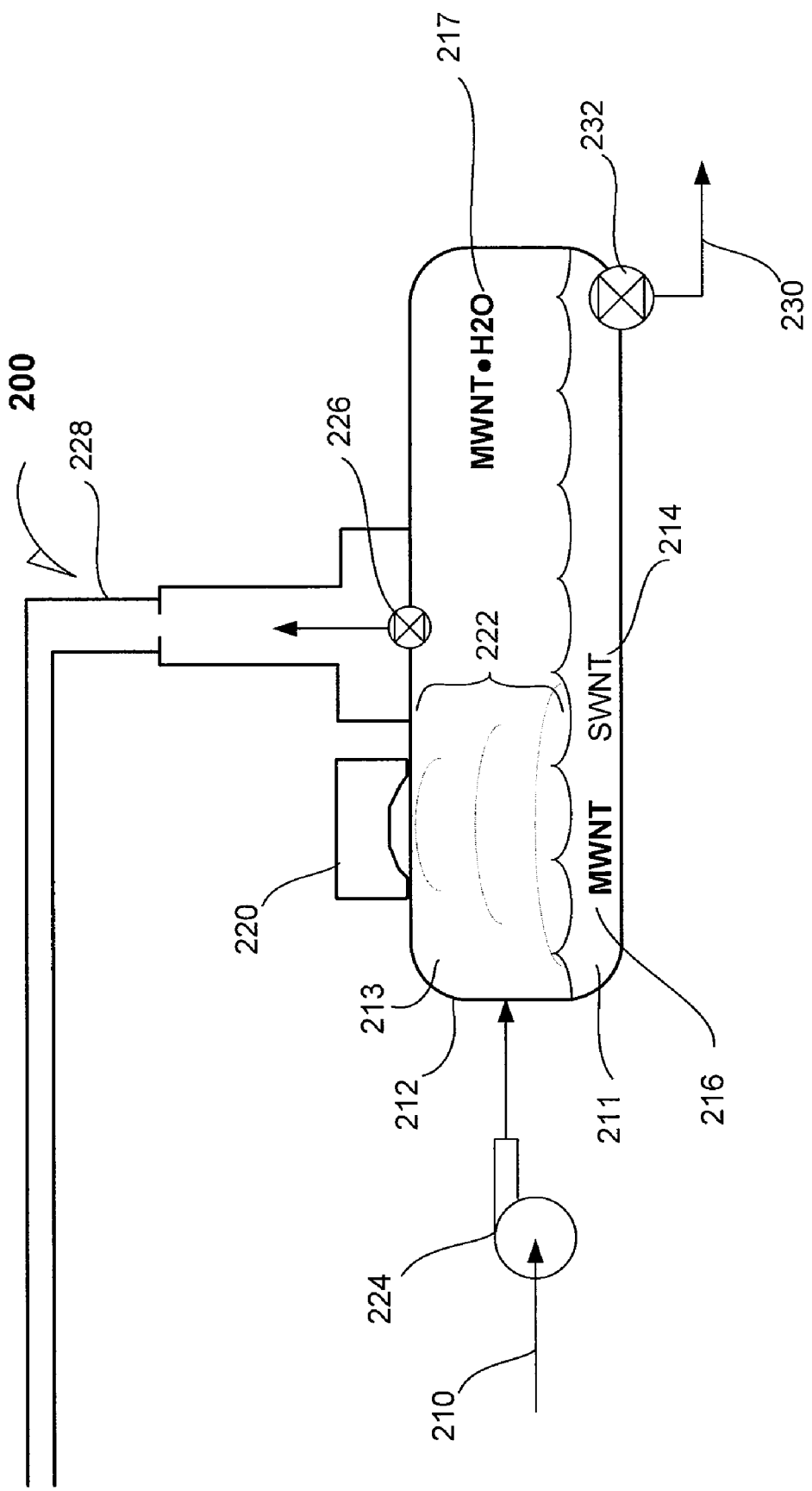
FIG. 2 shows a schematic depiction of a single-wall carbon nanotube purification process 200 according to an example embodiment.

The embodiments of a process, device, an apparatus, or an article described herein can be manufactured, used, or shipped in a number of positions and orientations. Some will be shown below, and numerous others will be understood by those of ordinary skill in the art upon reading the following disclosure.

The terms "wafer" and "substrate" used in the description include any structure having an exposed surface with which to form an electronic device or device component such as a component of an integrated circuit (IC). The term substrate is understood to include semiconductor wafers. The term substrate is also used to refer to semiconductor structures during processing and may include other layers such as silicon-on-insulator (SOI), etc. that have been fabricated thereupon. Both wafer and substrate include doped and undoped semiconductors, epitaxial semiconductor layers supported by a base semiconductor or insulator, as well as other semiconductor structures well known to one skilled in the art.

The production of single-wall carbon nanotubes (SWNTs) is carried out by one of several available processes. One method of SWNT production includes chemical vapor deposition (CVD) that may be plasma enhanced. CVD processing of carbon nanotubes causes a reaction of a carbon-containing gas with a metal catalyst particle. Such gases may include at least one of acetylene, ethylene, or ethanol. Useful catalysts include metal such as cobalt, nickel, iron, molybdenum, or a combination of these such as cobalt/iron or cobalt/molybdenum. Processing conditions for CVD production of carbon nanotubes may be performed at temperatures above 600° C.

One useful production technique is to configure the catalyst on a production substrate in the form of particles instead of planar films. Other useful production techniques include correlating the catalyst particle size with the diameter of the resulting carbon nanotubes.

In an embodiment, electric arc discharge is carried out such that powdered graphite may form into several structures including SWNTs, multi-walled carbon nanotubes (MWNTs), and other structures such as spheres, which are sometimes referred to as Buckyballs. Another SWNT production embodiment includes laser oblation of a graphite bulk. Another SWNT production embodiment includes high pressure treatment of carbon monoxide.

In an embodiment, the carbon nanotubes may be one nanometer or less in diameter and they are grown to several micrometers (microns) in length such as from about 0.5 microns to about 50 microns.

FIG. 1a shows a schematic depiction of a single-wall carbon nanotube purification process 100 according to an example embodiment. By use of an arc-discharge process on graphite, a mixture of SWNTs and MWNTs is produced. The mixture includes both semiconductive and electrically conductive nanotubes. These include semiconductive SWNTs and some electrically conductive SWNTs. The electrically conductive SWNTs are referred to as metallic. The MWNTs have electrically conductive properties, and they are also referred to as metallic.

A slurry 110 is made of the mixture of SWNTs and MWNTs. A fluid solvent is added to the mixture to form the slurry 110. Under the processing conditions set forth herein, the fluid solvent does not significantly decompose the semiconductive SWNTs. The slurry 110 is disposed in a vessel 112 and the slurry 110 includes suspended semiconductive and metallic SWNTs, one of which is designated as item 114. The slurry also includes suspended MWNTs, one of which is designated as item 116. The slurry 110 is shown with a liquid surface 118 and with a head space 113 above the liquid surface 118. In an embodiment, the head space 113 is an air-containing ambient. An air-containing ambient may also be referred to as an oxygen-containing ambient. Gases and vapors in the heat space 113 may be controlled depending upon the chemical environment that is being used. In an embodiment, gas or vapor in the head space 113 may be displaced with a gas or vapor that is useful to control dissolution of the metallic carbon nanotubes. These may include an unreactive gas ambient, an air-containing ambient, and an organic vapor ambient.

A microwave unit 120 is disposed near the vessel 112 and microwaves 122 are depicted being emitted from the microwave unit 120 toward the slurry 110. According to an embodiment, the microwave unit 120 is tuned to a frequency that energizes the MWNTs 116 and the metallic SWNTs 114 more than the SWNTs 114. Consequently, the MWNTs 116 and the metallic SWNTs absorb the microwaves at the appropriate frequency faster than the semiconductive SWNTs 114. As a result, the metallic SWNTs 114 and the MWNTs 116 become more prone to decomposition than the semiconductive SWNTs 114.

FIG. 1b shows a schematic depiction of the single-wall carbon nanotube purification process depicted in FIG. 1a after further processing according to an example embodiment. The schematic 101 depicts an energized slurry 111 with a lowered liquid surface 119 to represent some of the liquid in the slurry has vaporized.

The schematic 101 also depicts a portion of the conducting CNTs having changed chemical and physical properties and are designated as MWNT.H2O 117. The designation MWNT.H2O 117 is to indicate that the MWNTs have been decomposed into amorphous carbon or digested to volatile byproducts such as $CO_2$ in the energized slurry 111, and that a separation is taking place between the conductive and semiconducting CNTs. The MWNT.H2O 117 is not to be construed as a hydrated MWNT, rather, that the MWNT.H2O 117 has been digested or decomposed and is in solution with the liquid portion of the energized slurry 111.

In an embodiment where the energized slurry 111 includes water as part of the solvent solution, the symbol ".H2O" represents the conducting CNTs have been dissolved or otherwise decomposed into a solvent that includes water. In other embodiments where a substance other than water, for example an organic or organometallic solvent, is used, the ".H2O" designation represents that the conducting CNTs are digested or otherwise decomposed into such substance.

In an embodiment, processing between FIG. 1a and FIG. 1b represents batch distillation that results in a separation that is taking place between conducting CNTs and the semiconductive SWNTs 114.

Because of the selective heating effect of the microwaves 122 upon the MWNTs 116 and metallic SWNTs depicted in FIG. 1a, localized nanotube temperatures achieved on such conducting CNTs may be in a range from about 100° C. to about 2,500° C. In an embodiment, the localized slurry temperature may achieve a range from about 20° C. to about 1,000° C. in an oxygen rich solution. The selective heating effect causes the conducting CNTs to heat and decompose into $CO_2$ or to be digested into the solvent.

In an embodiment, the microwave unit 120 has a microwave frequency range from about 0.3 Gigahertz (GHz) to 300 GHz. Specific power delivered to a slurry of MWNTs and SWNTs is in a range from about 500 Watt/kg solids to about 12,000 Watt/kg solids. The energized slurry may be processed in a percent solids range from about 0.1% solids to about 90% solids.

An aqueous solvent may be used to form the slurry. The energized slurry 111 includes an aqueous solution with a volatile portion that includes decomposed conducting CNTs, or a suspension or precipitate of amorphous carbon that includes decomposed conducting CNTs. The energized slurry 111 also includes suspended semiconductive SWNTs 114 that have not substantially decomposed. The semiconductive SWNTs 114 may be dissolved but remain intact in solution. Useful solvents for aqueous based slurry include acids such as halide-based and sulfur-based acids.

In a process embodiment, an aqueous slurry is prepared with suspended solids of the carbon nanotube mixture in a concentration range from about 5 mg/L to about 5,000 mg/L. In a process embodiment, an aqueous slurry is prepared with suspended solids of the carbon nanotube mixture in a concentration range from about 5 mg/L to about 5,000 mg/L and with a solvent of sulfuric acid ($H_2SO_4$) in concentration range from about 0.01 Molar to about 1 Molar. In a process embodiment, an aqueous slurry is prepared with suspended solids of the carbon nanotube mixture in a concentration range from about 5 mg/L to about 5,000 mg/L and with a solvent of a strong acid in concentration range from about 0.01 Molar to about 1 Molar. In a process embodiment, an aqueous slurry is prepared with suspended solids of the carbon nanotube mixture in a concentration range from about 5 mg/L to about 5,000 mg/L and with a solvent of a weak acid in concentration range from about 0.01 Molar to about 1 Molar.

In a process embodiment, an aqueous slurry is prepared with suspended solids of the carbon nanotube mixture in a concentration range from about 5 mg/L to about 5,000 mg/L and with a solvent of potassium hydroxide (KOH) in concentration range from about 0.01 Molar to about 1 Molar. In a process embodiment, an aqueous slurry is prepared with suspended solids of the carbon nanotube mixture in a concentration range from about 5 mg/L to about 5,000 mg/L and with a solvent of a strong base in concentration range from about 0.01 Molar to about 1 Molar. In a process embodiment, an aqueous slurry is prepared with suspended solids of the carbon nanotube mixture in a concentration range from about 5 mg/L to about 5,000 mg/L and with a solvent of a weak base in concentration range from about 0.01 Molar to about 1 Molar.

An organic solvent may be used to form the slurry. The energized slurry 111 includes an organic solution with a volatile portion or suspended decomposition products that includes decomposed conducting CNTs. The energized slurry 111 also includes suspended semiconductive SWNTs 114 that have not substantially decomposed or digested. Useful solvents include ethyl lactate and dimethylchloride.

In a process embodiment, a slurry is prepared with suspended solids of the carbon nanotube mixture in a concentration range from about 5 mg/L to about 5,000 mg/L and with a solvent of acetic acid ($CH_3COOH$) in concentration range from about 0.01 Molar to about 1 Molar. In a process embodiment, a slurry is prepared with suspended solids of the carbon nanotube mixture in a concentration range from about 5 mg/L to about 5,000 mg/L and with a solvent of formic acid (HCOOH) in concentration range from about 0.01 Molar to about 1 Molar. In a process embodiment, a slurry is prepared with suspended solids of the carbon nanotube mixture in a concentration range from about 5 mg/L to about 5,000 mg/L and with a solvent of citric acid ($C_6H_8O_7$) in concentration range from about 0.01 Molar to about 1 Molar. In a process embodiment, a slurry is prepared with suspended solids of the carbon nanotube mixture in a concentration range from about 5 mg/L to about 5,000 mg/L and with a solvent of oxalic acid ($C_2H_2O_4$) in concentration range from about 0.01 Molar to about 1 Molar.

In an embodiment, a combination of aqueous and organic solvents may be used to dissolve carbon nanotubes. Treating a mixture of semiconducting and conducting CNTs may be carried out in an aqueous-organic liquid slurry that includes solvent additives such as hydrochloric and sulfuric acids.

FIG. 2 shows a schematic depiction of a single-wall carbon nanotube purification process 200 according to an example embodiment. In an embodiment, a slurry 210 of SWNTs 214 and MWNTs 216 is fed to an autoclave 212 by use of a high-pressure pump 224. High-pressure slurry pumps that are useful may be a Geho® pump manufacture by Weir n.v. of The Netherlands, or a Moyno® pump manufactured by Moyno Corporation of Springfield, Ohio.

Once the slurry 210 enters the autoclave 212, it is energized by microwaves to become an energized slurry 211. A microwave unit 220 is disposed near the autoclave 212 and microwaves 222 are depicted being emitted from the microwave unit 220 into the energized slurry 211. The microwaves 222 may be broadcast into a portion of the energized slurry 211 as depicted. In an embodiment, the microwaves 222 may be uniformly broadcast into all of the energized slurry 211 depending upon the processing practices. According to an embodiment, the microwave unit 220 is tuned to a frequency that energizes the conducting CNTS 216 more than the semiconducting CNTs 214. Consequently, the conducting CNTS 216 absorb the tuned microwaves faster than the Semiconducting Ss 214. As a result, the conducting CNTS 216 become more prone to digestion or decomposition into the liquid phase of the energized slurry 211. Digestion of the conducting CNTs will result in vaporized materials. Decomposition of the conducting CNTs will result in finely divided amorphous carbon.

Further processing includes allowing the vaporized CNTs MWNT.H2O 217 to exit the autoclave 212 through a vapor throttle valve 226 and to exit the system depicted through a waste flue 228. Decomposed CNTs may be removed from the slurry by centrifuge action. Similarly, the decomposed CNTs may be removed from the slurry by settling action. A slurry of concentrated semiconducting SWNTs 230 exits the autoclave 212 through a slurry throttle valve 232. Residual, unreacted conductive CNTs 216 may be present. In an embodiment, processing depicted in FIG. 2 represents continuous distillation that results in a separation of the MWNTs 216 and the SWNTs 214.

Further processing of the slurry of concentrated SWNTs 230 may be carried out including a repeated stage of treating the slurry of concentrated semiconductive SWNTs 230 to further remove any residual MWNT and metallic SWNT structures from the slurry.

Figure 3A:
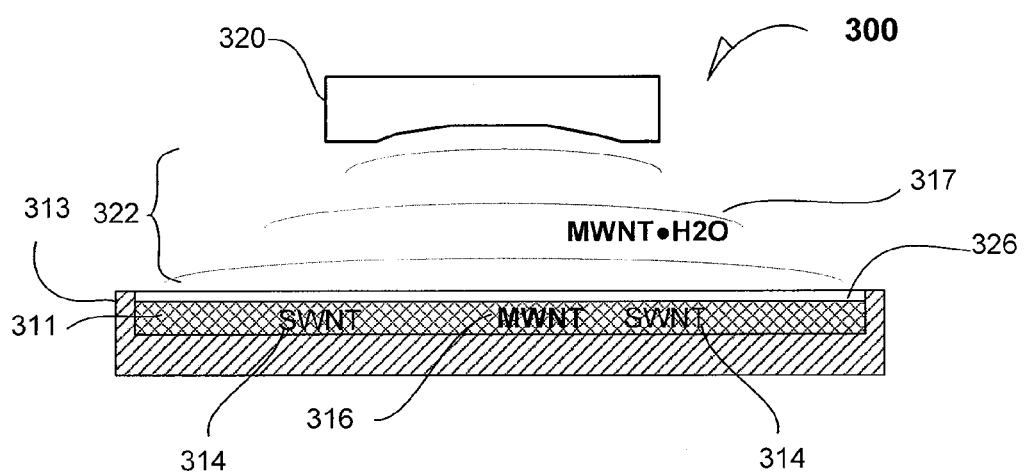
FIG. 3a shows a schematic depiction of a single-wall carbon nanotube purification process according to an example embodiment.

FIG. 3a shows a schematic depiction of a single-wall carbon nanotube purification process 300 according to an example embodiment.

In an embodiment, a slurry 311 of semiconducting CNTs and conducting CNTs is disposed in a vessel 312. The slurry 311 is energized by use of a microwave unit 320 that is disposed near the vessel 312. Microwaves 322 are depicted being emitted from the microwave unit 320 into the energized slurry 311. According to an embodiment, the microwave unit 320 is tuned to a frequency that energizes the conducting CNTs 316 more than the semiconducting CNTs 314. Consequently, the conducting CNTs absorb the tuned microwaves faster than the semiconducting SWNTs 314. As a result, the conducting MWNTs 316 become more prone to decomposition or digestion by the solvent than the semiconductive SWNTs 114.

Further processing includes allowing the vaporized MWNT.H2O 317 to exit the vessel 312 through a porous membrane 326. The porous membrane 326 provides a protective environment for the slurry and allows volatile MWNT-containing portions of the energized slurry 311 to escape from the vessel 312. Where localized slurry temperatures may be extremely high compared to ambient temperatures, the porous membrane 326 prevents flash vaporization of localized liquid regions in the slurry from ejecting semiconductive SWNTs 314. Consequently, a slurry concentrated SWNTs remain within the vessel 312.

Figure 3B:
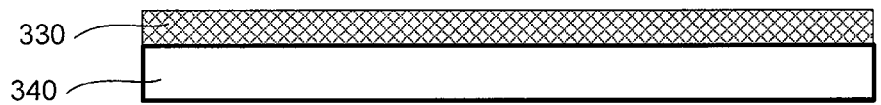
FIG. 3b shows cross-section side elevation of a SWNT mat that has been purified to remove substantially all metallic carbon nanotubes that were produced during the formation of the semiconductive carbon nanotubes according to an example embodiment.

FIG. 3b shows cross-section side elevation of a SWNT mat 330 that has been purified to remove substantially all metallic carbon nanotubes that were produced during the formation of the semiconductive carbon nanotubes according to an example embodiment. The mat 330 may be further consolidated for use in semiconductor device manufacture. Further, the mat 330 may be mixed in a liquid and treated to centrifuge action to separate the amorphous carbon from the semiconductive CNTs.

In an embodiment, processing between FIG. 3a and FIG. 3b represents batch purification distillation that results in a separation of conducting and semiconducting CNTs to achieve a purified SWNT mat 330. The mat 330 may include a distribution of SWNTs 314 that are essentially 100% pure. The quantity of 100% pure means impurities are present in an amount of less than 1 part per billion (ppb) for each impurity, and less than 0.01 part per million (ppm) for all impurities. In an embodiment where the SWNT/MWNT mixture is produced by arc-discharge processing, the only impurity is residual MWNTs 316.

In an embodiment, the mat 330 may be used as a semiconductive wafer for microelectronic device processing. The thickness of the mat 330 may be in a range from about 10 angstrom to about 10 microns. In an embodiment, the mat 330 is formed by purifying a slurry batch within the vessel 312 as set forth and illustrated in FIG. 3a. After a slurry batch is purified, the porous membrane 326 may be removed and an additional slurry may be filled on top of the purified mat. Purifying of the additional slurry will result in an aggregated mat 330.

In an embodiment, the mat 330 may be formed and purified according to disclosed embodiments, but the slurry is first formed on a dielectric substrate 340 such that a semiconductor on insulator (SOI) structure is formed. The substrate 340 may be made of dielectric material such as silicon dioxide.

In an embodiment, the mat 330 is a structure of SWNTs that have been grown on the dielectric substrate 340 by a plasma-enhanced chemical vapor deposition technique (PECVD) that results in a mixture of SWNTs and electrically conducting CNTs. The mat is then purified by the application of a solvent and microwave energy. The solvent and microwave energy may result in the decomposition of conducting CNTs or the dissolution of the conducting CNTs.

Figure 4:
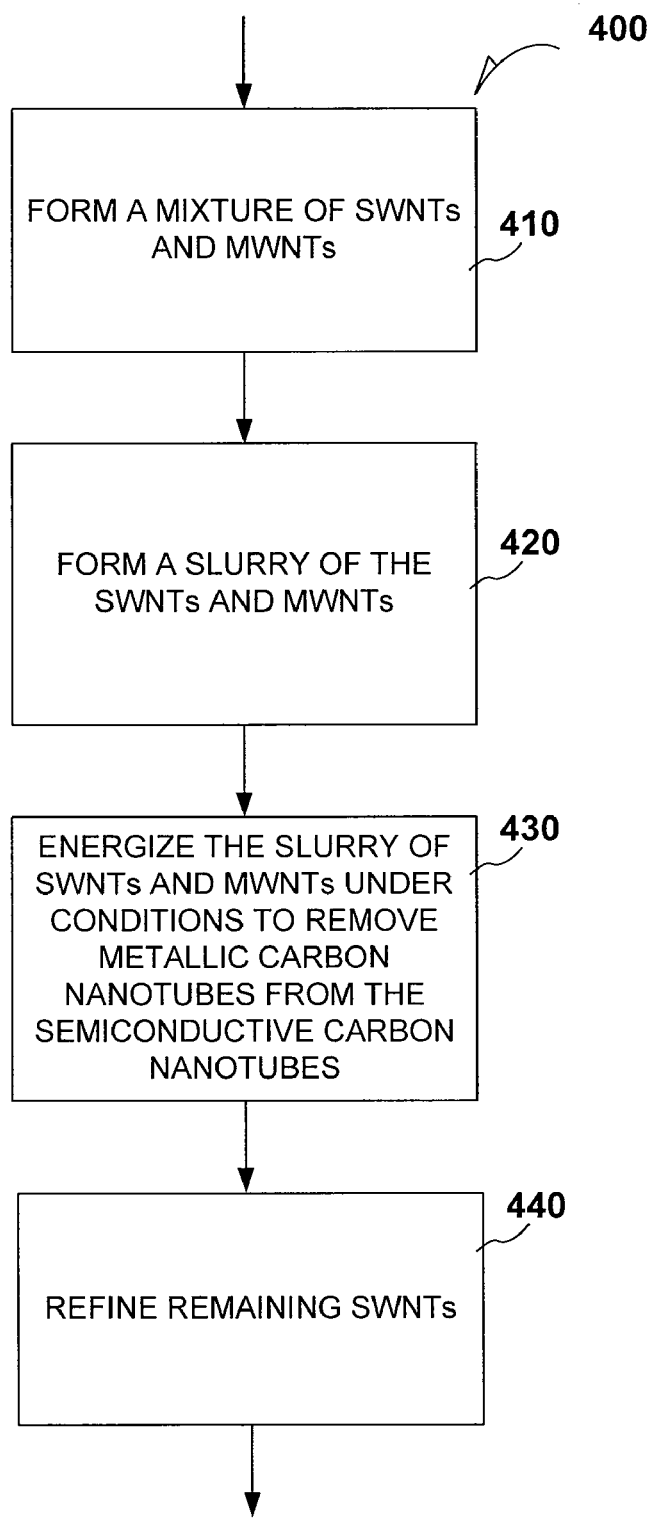
FIG. 4 is a process flow diagram 400 according to an example embodiment.

FIG. 4 is a process flow diagram 400 according to an example embodiment.

At block 410, the process 400 includes forming a mixture of SWNTs and MWNTs. In an example embodiment, the mixture of SWNTs and MWNTs is formed by electric arc-discharge synthesis from graphite precursor material.

At 420, the process includes forming a slurry of the mixture of single-wall carbon nanotubes and multi-wall carbon nanotubes. In an example embodiment, the slurry is an aqueous base with solvents such as solvent embodiments set forth in this disclosure. In an example embodiment, the slurry is an organic base with solvents such as solvent embodiments set forth in this disclosure.

At 430, the process includes energizing the slurry single-wall carbon nanotubes and multi-wall carbon nanotubes under conditions to remove the metallic carbon nanotubes from the semiconductive carbon nanotubes. In an example embodiment, a batch-distillation autoclave process is carried out such as is depicted in FIG. 1a and FIG. 1b. In an example embodiment, a continuous-distillation autoclave process is carried out such as is depicted in FIG. 2. In an example embodiment, a batch-purification process is carried out such as is depicted in FIG. 3a and FIG. 3b. In an embodiment, the process commences and terminates at 430.

At 440, the process includes refining single-wall carbon nanotubes to remove any remaining electrically conductive carbon nanotubes and to achieve a semiconductive carbon nanotube material. In an example embodiment, a batch-purification process is carried out such as is depicted in FIG. 3a and FIG. 3b.

The methods and processes described herein do not have to be executed in the order described, or in any particular order. Thus, various activities described with respect to the methods identified herein can be executed in repetitive, simultaneous, serial, or parallel fashion.

This Detailed Description refers to the accompanying drawings that show, by way of illustration, specific embodiments in which the present disclosure may be practiced. These embodiments are described in sufficient detail to enable those skilled in the art to practice the disclosed embodiments. Other embodiments may be used and structural, logical, and electrical changes may be made without departing from the disclosed embodiment of the present disclosure. The various embodiments are not necessarily mutually exclusive, as some embodiments can be combined with one or more other embodiments to form new embodiments.

The Detailed Description is, therefore, not to be taken in a limiting sense, and the disclosed embodiments are defined only by the appended claims, along with equivalents to which such claims are entitled.

The Abstract is provided to comply with 37 C.F.R. §1.72 (b), requiring an abstract that will allow the reader to quickly ascertain the nature of the technical disclosure. It is submitted with the understanding that it will not be used to interpret or limit the meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A process, comprising:
    treating a mixture of metallic carbon nanotubes and semiconductive carbon nanotubes in a liquid by applying microwave energy, the liquid selected such that the semiconductive carbon nanotubes do not significantly decompose in the liquid, wherein treating the mixture is carried out under conditions of applying the microwave energy to the liquid containing the metallic carbon nanotubes and semiconductive carbon nanotubes to remove metallic carbon nanotubes but to leave semiconductive carbon nantoubes.

2. The process of claim 1, wherein applying microwave energy includes tuning the microwave energy to a frequency such that the metallic carbon nanotubes absorb microwave energy at the frequency faster than the semiconductive carbon nanotubes absorb microwave energy at the frequency.

3. The process of claim 1, wherein treating the mixture is carried out in an aqueous slurry of the metallic and semiconductive carbon nanotubes.

4. The process of claim 1, wherein treating the mixture is carried out in an organic-liquid slurry of the metallic and semiconductive carbon nanotubes.

5. The process of claim 1, wherein treating the mixture is carried out by achieving a localized temperature for the metallic carbon nanotubes at a temperature range from about 20° C. to about 2,500° C.

6. The process of claim 1, wherein treating the mixture is carried out by achieving a localized temperature for the metallic carbon nanotubes at a temperature range from about 20° C. to about 1,000° C. and in an air-containing ambient.

7. The process of claim 1, wherein treating the mixture is carried out by achieving a localized temperature for the metallic carbon nanotubes and in an aqueous-organic liquid slurry of the metallic and semiconductive carbon nanotubes, and wherein the slurry is one of acidic or basic.

8. The process of claim 1, wherein treating the mixture is carried out at a temperature range from about 20° C. to about 2,500° C. and in an air-containing ambient, and in an aqueous-organic liquid slurry of the metallic and semiconductive carbon nanotubes.

9. The process of claim 1, wherein the microwave energy is applied at a frequency range from about 0.3 GHz to about 300 GHz and a power from about 500 Watt/kg solids to about 12,000 Watt/kg solids.

10. The process of claim 1 further including forming the mixture of metallic and semiconductive carbon nanotubes by an electric-arc discharge in the presence of a carbon precursor material.

\* \* \* \* \*

UNITED STATES PATENT AND TRADEMARK OFFICE
CERTIFICATE OF CORRECTION

PATENT NO. : 8,052,075 B2
APPLICATION NO. : 12/062405
DATED : November 8, 2011
INVENTOR(S) : Eugene P. Marsh et al.

It is certified that error appears in the above-identified patent and that said Letters Patent is hereby corrected as shown below:

On the face page, in field (56), under "Other Publications", in column 1, line 3, delete "Monthy" and insert -- Monthly --, therefor.

On the face page, in field (56), under "Other Publications", in column 2, line 10, delete "Walled" and insert -- Wall --, therefor.

On the face page, in field (74), in "Attorney, Agent, or Firm", in column 2, line 1, delete "Lindberg" and insert -- Lundberg --, therefor.

In column 8, line 12, in Claim 1, delete "nantoubes." and insert -- nanotubes. --, therefor.

Signed and Sealed this
Tenth Day of January, 2012

David J. Kappos
*Director of the United States Patent and Trademark Office*